United States Patent [19]

Nagata

[11] Patent Number: 4,861,137
[45] Date of Patent: Aug. 29, 1989

[54] MOUNTING DEVICE FOR A RESIN LENS

[75] Inventor: Niro Nagata, Kawasaki, Japan

[73] Assignee: Kabushiki Kaisha Toshiba, Kawasaki, Japan

[21] Appl. No.: 134,973

[22] Filed: Dec. 14, 1987

[30] Foreign Application Priority Data

Dec. 19, 1986 [JP] Japan .................. 61-301347

[51] Int. Cl.$^4$ .............................. G02B 7/02
[52] U.S. Cl. .................................... 350/253
[58] Field of Search .................. 350/253, 252

[56] References Cited

U.S. PATENT DOCUMENTS

| 3,279,309 | 10/1966 | Goldberg | 350/253 |
| 4,236,790 | 12/1980 | Smith | 350/253 |
| 4,720,168 | 1/1988 | Kaneko | 350/253 |

FOREIGN PATENT DOCUMENTS

| 59-15205 | 1/1984 | Japan | 350/253 |
| 59-15206 | 1/1984 | Japan | 350/253 |
| 59-88706 | 5/1984 | Japan | 350/253 |

OTHER PUBLICATIONS

Seiken, "Process Technology of R & D Encouraging Society" Seminar Text, Jan. 29 and 30, 1986, p. 62.

Primary Examiner—Bruce Y. Arnold
Assistant Examiner—Loha Ben
Attorney, Agent, or Firm—Foley & Lardner, Schwartz, Jeffery, Schwaab, Mack, Blumenthal & Evans

[57] ABSTRACT

The mounting device for a resin lens, used for refracting a light beam in the formation of an image, has a housing in which laser diode and bimetals are supported. An acrylic-resin lens, for use as the resin lens, is supported by the bimetals. As the ambient temperature changes, the focal point of the lens is displaced, and at the same time, moving parts of the bimetals are displaced. As its focal point is displaced in this manner, the lens shifts its position. Thus, the position of the focal point of the acrylic-resin lens is corrected by means of the bimetals.

12 Claims, 2 Drawing Sheets

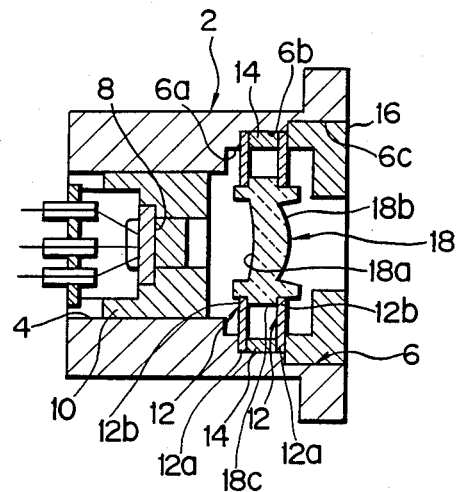
F I G. 1
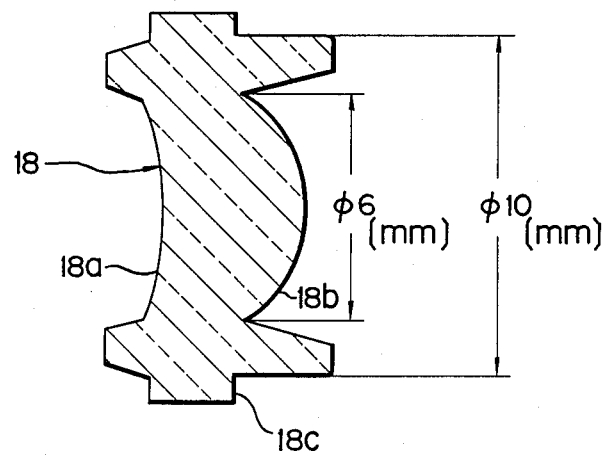
F I G. 2

MOUNTING DEVICE FOR A RESIN LENS

BACKGROUND OF THE INVENTION

The present invention relates to a mounting device for a resin lens, such as a nonspherical lens for condensing laser beams, used, for example, in a laser printer which forms images by means of the laser beams.

In image-making apparatuses, such as copying machines, printers, etc., the utilization of laser beams has only recently become frequent in forming an electrostatic latent image on the surface of a photosensitive drum for use as an image carrier.

In using laser beams as the latent-image forming means in these image-making apparatuses, an emanative laser beam emitted from a laser device, such as a semiconductor laser, must be temporarily converted into a parallel beam. To attain this, a so-called collimator lens is generally used as a condensing lens.

Conventional spherical lenses are subject to spherical aberration. In other words, the refractive index of one region of a spherical lens is different from that of another. Accordingly, light beams passing near the center of the lens and through its peripheral portion cannot converge on one point, thus causing defocusing. To avoid this, several concave or convex lenses are combined, removing the spherical aberration.

The same is true of a collimator lens for condensing laser beams, its spherical aberration must also be removed. Therefore, a conventional collimator lens is composed of at least three spherical lenses, whether concave or convex.

Such an arrangement requires the use of a number of lenses assembled together with high accuracy. Thus, the manufacturing costs are inevitably increased.

To cope with this problem, single lenses without spherical aberration have recently been developed. These nonspherical lenses have a parabolic or hyperbolic profile. If the nonspherical lenses are made of glass, their special shape does not allow them to be conventionally ground by an automatic grinding process. In other words, these lenses must be ground manually, making it impossible for them to be mass-produced as well as impractical in view of their costs. Thereupon, pressed, nonspherical plastic lenses are more frequently used due to their practicality.

These nonspherical plastic lenses, compared with glass lenses composed of three concave or convex lenses, are less prone to undulatory aberration which is equivalent to the spherical aberration of spherical lenses. Made of plastic material, however, the nonspherical lenses are susceptible to thermal expansion as a result of temperature change. Therefore, their refractive indexes fluctuate, causing displacement of their focal points. Accordingly, the condensing rate of the nonspherical lenses is lowered, so that images obtained are subject to variation, and therefore, are poor in quality.

SUMMARY OF THE INVENTION

The object of the present invention is to provide a mounting device for a resin lens, which can prevent fluctuations in the condensing rate of the lens, arising from displacement of its focal point, as a result of thermal expansion attributable to changes in the ambient temperature, and thereby ensure improved image quality.

According to an aspect of the present invention, there is provided a mounting device for a resin lens which refracts light used in image formation, this mounting device comprising a light source emitting the light; supporting means for supporting the light source and the resin lens; and temperature compensating means including first and second members having different coefficients of thermal expansion, so that the compensating means is deformed by a temperature change, due to the difference in thermal expansion coefficient between the first and second members, whereby the resin lens is displaced.

According to the present invention, the resin lens is displaced by the temperature compensating means, as the position of the focal point of the lens is shifted due to thermal expansion of the lens. Thus, the condensing rate of the resin lens is prevented from fluctuating.

BRIEF DESCRIPTION OF THE DRAWINGS

FIG. 1 is a sectional view showing an embodiment of a resin-lens mounting device according to the present invention;

FIG. 2 is a sectional view of an acrylic-resin lens;

DETAILED DESCRIPTION OF THE PREFERRED EMBODIMENT

Figure 3:
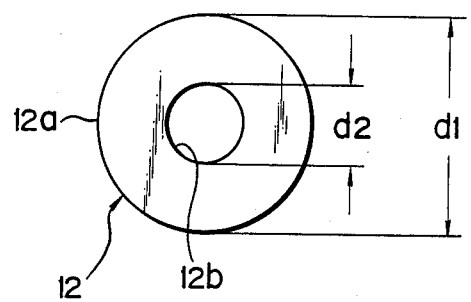
FIG. 3 is a plan view of a bimetal of the device as is shown in FIG. 1.

An embodiment of the present invention will now be described with reference to the accompanying drawings.

In FIG. 1, numeral 2 designates a cylindrical housing with a narrower section and 6 a wider section 6. Inside the narrower section, a laser diode 8 for laser-beam emission is held by means of cylindrical member 10. The wider section includes first, second, and third step portions 6a, 6b and 6c, located successively from the narrower-section side. The diameter of the second step portion 6b is greater than that of first step portion 6a, and the third step portion 6c is greater than that of portion 6b. Two doughnut-shaped bimetals elements or bimetals 12 are held inside second step portion 6b of wider section 6. Spacers 14 are interposed between these bimetals. Fixing member 16 is disposed inside third step portion 6c of section 6. Outer peripheral edge portions 12a of bimetals 12 are fixed inside second step portion 6b by member 16. Thus, dependent on the temperature change, inner peripheral edge portions 12b of bimetals 12 are displaced. Outer peripheral portion 18c of acrylic-resin lens 18 is held between edge portions 12b of bimetals 12. Lens 18 has nonspherical incidence surface 18a and refracting surface 18b, as is shown in FIG. 2. Laser diode 8 is located on the focal point of lens 18.

Figure 4:
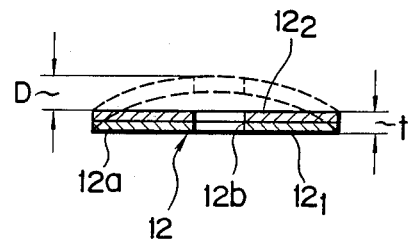
FIG. 4 is a sectional view of the bimetal as is shown in FIG. 3.

Generally, in doughnut-shaped bimetal 12 as shown in FIGS. 3 and 4, displacement D of inner peripheral edge portion 12b, as its moving part, is given by $$D = K\Delta T(d_1^2 - d_2^2)/(4t),$$

where K is a constant, $\Delta T$ is a temperature difference, and $d_1$, $d_2$, and t are the outside diameter, inside diameter, and thickness, respectively, of bimetal 12.

As seen from the above equation, the displacement of edge portion 12b is proportional to temperature difference $\Delta T$.

Bimetal 12 includes first and second members $12_1$, and $12_2$ having different coefficients of thermal expansion. More specifically, the bimetal is composed of NiCrFe—36NiFe (nickel-chromium steel and nickel steel), for example, which has constant $K=14.2\times 10^{-6}/°C$., outside diameter $d_1=17$ mm, inside diameter $d_2=10$ mm, and thickness $t=0.3$ mm. In this case, if temperature difference $\Delta T$ is 20 deg, for example, displacement D of inner peripheral edge portion 12b for use as the moving part, according to the above equation, is $$D = \{14.2 \times 10^{-6} \times 20 \times (17^2 - 10^2)\}/(4 \times 0.3)$$
$$= 44.7 \ (\mu m).$$

Acrylic-resin lens 18 is formed of acrylic resin (plastic), of which the thermal expansion coefficient is $5\times 10^{-5}/°C$. Lens 18 has a diameter of 6 mm. The profile of each of incidence and refracting surfaces 18a and 18b of lens 18 is parabolic.

Acrylic-resin lens 18 tends to expand thermally with an increase in temperature, so that its refractive index for laser beams changes. As a result, the focal point of lens 18 shifts its position. The displacement of the focal point is proportional to temperature difference $\Delta T$. The results of an experiment indicate that a temperature rise of 20 deg causes a displacement of approximately 44 $\mu$m of the focal point.

Nonspherical acrylic-resin lens 18 will now be described, constructed in the above manner, as to its use in a laser printer.

In a normal room-temperature condition, bimetals 12 remain planar without becoming deformed. When the laser printer starts printing, an emanative laser beam emitted from laser diode 8, located on the focal point of lens 18, is converted into a parallel beam by lens 18 which is held by the planar bimetals. Then, the parallel laser beam is projected on a polygon mirror by means of a beam compressor (not shown) or the like. The beam is reflected by the mirror, guiding it to the surface of a photosensitive drum. The surface of the drum, which is charged in advance, is exposed to the laser beam. Thus, an electrostatic latent image is formed on the drum surface.

If the temperature around acrylic-resin lens 18 rises, the lens is expanded gradually by the temperature increase. As a result, the focal point of lens 18 shifts its position. At the same time, bimetals 12 are also deformed by the temperature increase. As the most mobile parts or inner peripheral edge portions 12b of bimetals 12 are displaced, lens 18, which is held between portions 12b, slides inside housing 2. More specifically, if the temperature increases 20 deg, for example, the focal point of lens 18 is displaced by approximately 44 $\mu$m. On the other hand, edge portions 12b of bimetals 12, along with lens 18, shift approximately 44.7 $\mu$m. Therefore, when the temperature rises, the focal point of lens 18 hardly changes its position, compensated by the movement of lens 18 inside housing 2. However, there is a small difference between the respective displacements of the focal point of lens 18 and bimetals 12. The manufacturing accuracy of bimetals 12 is $\pm 5\%$. The difference in the displacement can be restricted to a minute degree if the accuracy of $\pm 5\%$ is ignored. The distance from laser diode 8 to acrylic-resin lens 18 is equivalent to the focal distance of the thermally expanded lens. The emanative laser beam emitted from diode 8 is converted into a parallel beam by lens 18. Thereafter, the laser beam is applied to the previously charged surface of the photosensitive drum, via an optical system including the beam compressor (not shown), polygon mirror, etc. Thus, an electrostatic latent image is formed on the drum surface.

When the temperature rises, according to the arrangement described above, acrylic-resin lens 18 expands thermally. As a result, the refractive index of lens 18 changes, so that the focal point of lens 18 shifts its position. At the same time, however, bimetals 12 are displaced. Accordingly, lens 18, along with the moving parts or inner peripheral edge portions 12b of bimetals 12, are slid inside housing 2 for a distance equivalent to the displacement of the focal point of lens 18. Thus, the laser beam, emitted from laser diode 8, is always located on the focal point of lens 18. Therefore, if the temperature varies, the emanative laser beam is securely converted into a parallel beam by lens 18. Thus, the image quality will not be lessened, while the condensing rate of lens 18 cannot be lowered by the displacement of its focal point. It is therefore possible to obtain a clear, high quality image.

The present invention is not limited to the embodiment described above. For example, the bimetals may be of any material and size, provided they can correct for the displacement of the resin lens's focal point. Further, the bimetals are not limited to two in number. One bimetal may serve just as well, provided that it moves the resin lens satisfactorily.

What is claimed is:

1. A temperature compensating mounting device for a refractive lens, comprising:
   a light source;
   means for supporting the light source; and
   temperature compensating means, deformable in response to a temperature change, for displacing the lens in respect to the light source, the temperature compensating means being donut-shaped and having:
   an outer peripheral edge supported by the supporting means; and
   an inner peripheral edge supporting the lens and displaceable with reference to the outer peripheral edge in response to a temperature change.

2. The lens mounting device of claim 1, wherein the temperature compensating means is a bimetallic element.

3. The lens mounting device of claim 2, wherein the bimetallic element, in response to temperature changes, displaces the lens in accordance with temperature induced displacement of the focal point of the lens.

4. The lens mounting device of claim 3, wherein the bimetallic element displaces the lens in a direction opposite to the thermally induced displacement of the focal point of the lens.

5. The lens mounting device of claim 1, in which the temperature compensating means includes at least two bimetallic elements.

6. The lens mounting device of claim 1, in which the light source is positioned at the focal point of the lens.

7. The lens mounting device according to claim 1, wherein the supporting means includes a housing in which the light source, lens and temperature compensating means are enclosed.

8. The lens mounting device of claim 1, in which the lens is formed of plastic, resin or acrylic resin.

9. The lens mounting device of claim 1, wherein the lens has a non-spherical surface for refracting light from the light source.

10. A temperature compensating mounting device for a lens, comprising:
- a housing;
- a light source at one end of the housing;
- a lens at the other end of the housing;
- a donut-shaped temperature compensating means supported at its outer periphery by the housing; and
- mounting surfaces on the lens engaging the inner periphery of said compensating means for supporting the lens within the centrally located opening of the temperature compensating means.

11. The mounting device of claim 10, wherein the temperature compensating means includes at least two bimetallic elements.

12. The mounting device of claim 11, wherein the temperature compensating means is formed of metals that cause it to displace in thermal deformation in a direction and in an amount opposite to the thermal displacement of the focal point of the lens.

* * * * *